Figure 1:
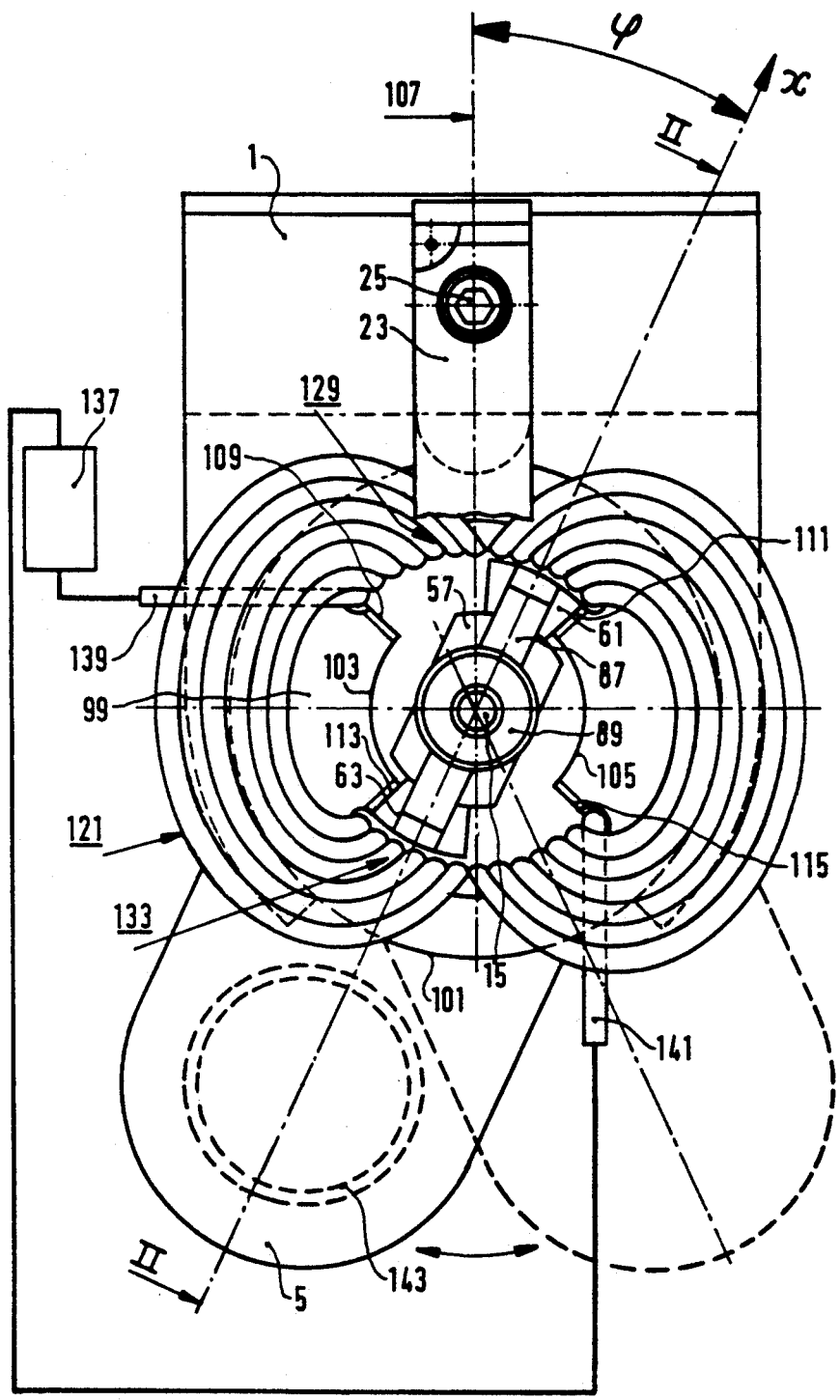

United States Patent [19]
Kamerbeek et al.

[11] Patent Number: 5,158,262
[45] Date of Patent: Oct. 27, 1992

[54] DEVICE FOR INTERRUPTING A MATERIAL FLOW

[75] Inventors: Evert M. H. Kamerbeek; Albertus J. C. van der Borst; Poul K. Larsen; Johannes J. van der Leek; Wilhelmus C. P. M. Meerman; Nicolaas H. J. M. Van Stiphout, all of Eindhoven, Netherlands

[73] Assignee: U.S. Philips Corporation, New York, N.Y.

[21] Appl. No.: 691,753

[22] Filed: Apr. 26, 1991

[30] Foreign Application Priority Data

Dec. 3, 1990 [NL] Netherlands ............... 9002642

[51] Int. Cl.⁵ ........................... F16K 31/08
[52] U.S. Cl. .................. 251/129.11; 251/65; 251/337
[58] Field of Search ............ 251/129.11, 337, 65

[56] References Cited

U.S. PATENT DOCUMENTS

| | | |
|---|---|---|
| 3,484,074 | 12/1969 | Lynes et al. |
| 3,532,121 | 1/1970 | Sturman |
| 3,974,850 | 8/1976 | Pierson ............... 251/337 X |
| 4,625,943 | 12/1986 | Groger ............... 251/337 X |
| 4,895,344 | 1/1990 | Brand et al. ......... 251/129.11 |
| 4,913,114 | 4/1990 | Kalippke et al. ..... 251/129.11 X |
| 4,976,237 | 12/1990 | Bollinger ........... 251/129.11 X |

Primary Examiner—Arnold Rosenthal
Attorney, Agent, or Firm—Paul R. Miller

[57] ABSTRACT

A device is set forth for interrupting a material flow by means of a shutter 5 fastened on a spindle 11, which spindle 11 is rotatably supported in a housing 1 of the device. The device is provided with a torsion spring 33 which is elastically deformable through rotation of the spindle 11, with substantially equal amounts of mechanical energy being stored in the torsion spring 33 through elastic deformation in a first position of the shutter 5. The material flow is shut off during this operation, and in a second position of the shutter 5 the material flow begins. The spindle 11 is provided with a permanent magnet 57 having pole shoes 61, 63 which are held against stops 109, 115 of a magnetic yoke 99 in the first position under the influence of the magnetic field of the magnet 57, and which are held against stops 111, 113 of the yoke 99 in the second position. The yoke 99 is provided with an electric coil 121. The shutter 5 is displaceable from a rest position to one of the two positions by an alternating current in the coil 121, whereas a direct current in the coil 121 attenuates the magnetic field of the magnet 57, so that the shutter 5 is displaced from the relevant position to the other position under the influence of the torsion spring 33. The device is suitable for use in a system for the deposition of materials in the form of thin layers on substrates. In such a system, the shutter 5 periodically interrupts a material flow coming from a source of material and aimed at the substrate, so that a desired composition of the layer is obtained.

6 Claims, 4 Drawing Sheets 5,158,262

DEVICE FOR INTERRUPTING A MATERIAL FLOW

The invention relates to a device for interrupting a material flow by means of a shutter which is displaceable relative to a housing of the device from a first position to a second position, the material flow being shut off during operation in one of the two positions.

BACKGROUND OF THE INVENTION

A device of the kind described above is known from the MBE-Review, no. 2, March 1990, published by VG Semicon Limited. The known device is used in systems for depositing materials, such as, for example, superconducting materials, in the form of thin layers on substrates. In such systems, a substrate is consecutively exposed to different material flows, each of which is derived from a source of material which is active continuously during a certain time. A predetermined thickness and composition of the thin layers can be obtained since the material flows are each periodically interrupted by a shutter. In the known device, the shutter is displaceable by means of a pneumatic drive unit which is situated outside the deposition chamber of the system, which is in a vacuum condition, in a system as described above.

A disadvantage of the known device is that for each displacement of the shutter the drive unit has to supply a quanity of energy required for the displacement which is to be provided from the exterior. In addition, unequal and inaccurate layer thicknesses are created in the deposition of layers having a thickness of only a few atom diameters, for which very short deposition times are used, because the time required for a displacement of the known shutter is too great in relation to the deposition time used owing to the mass inertia in the drive unit.

SUMMARY OF THE INVENTION

The invention has for its object to provide a device for interrupting a material flow which does not exhibit the disadvantages mentioned above.

The device according to the invention is for this purpose characterized in that the device comprises a mechanical spring assembly having at least one mechanical spring which is elastically deformable by a displacement of the shutter relative to the housing with substantially equal amounts of mechanical energy being stored in the spring assembly through elastic deformation in the first position and in the second position. Thanks to the use of the spring assembly, a quantity of energy stored in the spring assembly through elastic deformation during a previous displacement is available for each subsequent displacement of the shutter, so that the device requires only a comparatively small supply of energy. In addition, a desired closing and opening time can be obtained through an optimization of the spring stiffness of the mechanical spring and the moving mass of the shutter.

A particular embodiment of a device according to the invention, which provides a simple support for the shutter and a practical construction of the spring assembly, is characterized in that the shutter is rotatably supported in the housing, while the mechanical spring is a torsion spring which is fastened to the housing near a first end and which is fastened to a rotation spindle of the shutter near a second end.

A further embodiment of a device according to the invention, in which the difference between the quantities of mechanical energy stored in the spring assembly in the first position and in the second position is so small as to be negligible, is characterized in that the torsion spring is formed by a circular cylindrical bush having a helical incision.

A yet further embodiment of a device according to the invention, in which no further drive unit is required in addition to the spring assembly, is characterized in that the device is provided with means for holding the shutter relative to the housing in each of the two positions against the spring force of the spring assembly.

A special embodiment of a device according to the invention is characterized in that the means comprise a permanent magnet, while the device is also provided with an electric field attenuation coil. The use of the permanent magnet means that the shutter can be held in either of the two positions in a reliable manner and without energy being supplied. The field attenuation coil generates an electromagnetic field during a short period with a polarity opposite to that of the magnetic field of the permanent magnet, so that the field of the permanent magnet is attenuated and the shutter is moved to the other position under the influence of the spring assembly.

A further embodiment of a device according to the invention, which provides an accurate operation of the device thanks to a favourable magnetic field characteristic, is characterized in that the magnet is fastened to the rotation spindle and the field attenuation coil is fastened to the housing, the magnet resting against stops of a magnetic yoke of the field attenuation coil in either of the two positions.

A still further embodiment of a device according to the invention is characterized in that the magnet is provided with pole shoes which rest against the stops in either of the two positions. The use of the pole shoes protects the magnet from mechanical peak loads which occur when the shutter reaches either of the two positions during a displacement. In addition, a particularly effective magnetic field is provided through the use of the pole shoes.

A particular embodiment of a device according to the invention is characterized in that the device comprises an electric excitation coil with which the shutter is displaceable to one of the two positions from a rest position in which no mechanical energy is stored in the spring assembly. When the excitation coil is provided with an alternating current having an electrical frequency which is substantially equal to a mechanical natural frequency determined by the spring stiffness of the mechanical spring and the moving mass of the shutter, the shutter is brought from the rest position into one of the two positions by means of a small supply of energy.

A further embodiment of a device according to the invention, which provides a compact construction of the device, is characterized in that the device comprises an integrated field attenuation and excitation coil.

BRIEF DESCRIPTION OF THE DRAWING FIGURES

Figure 2:
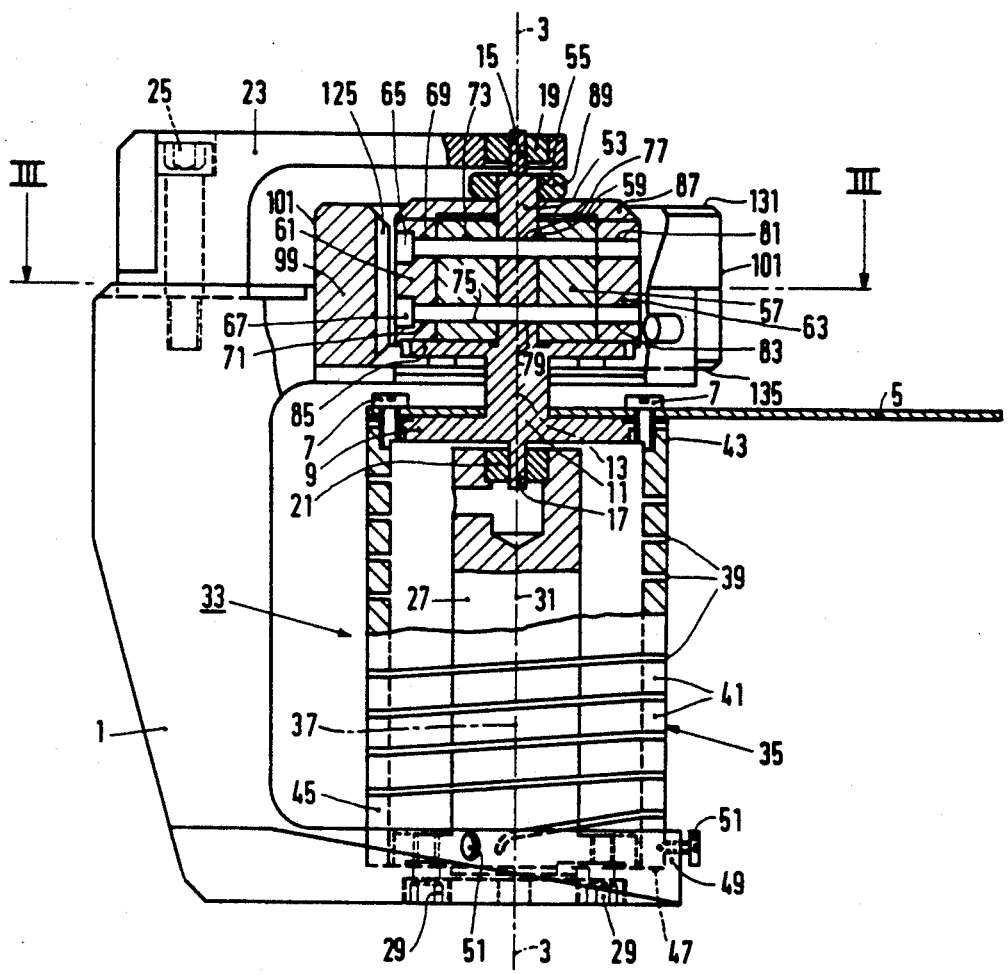
Figure 3:
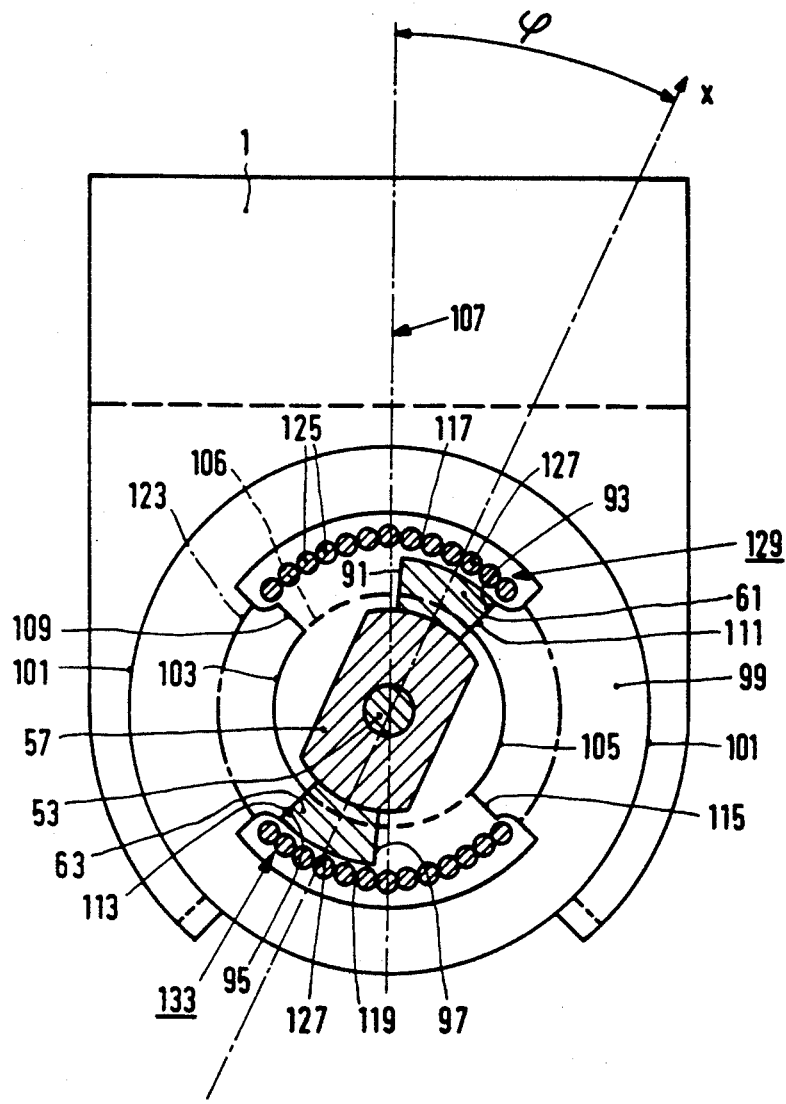
Figure 4:
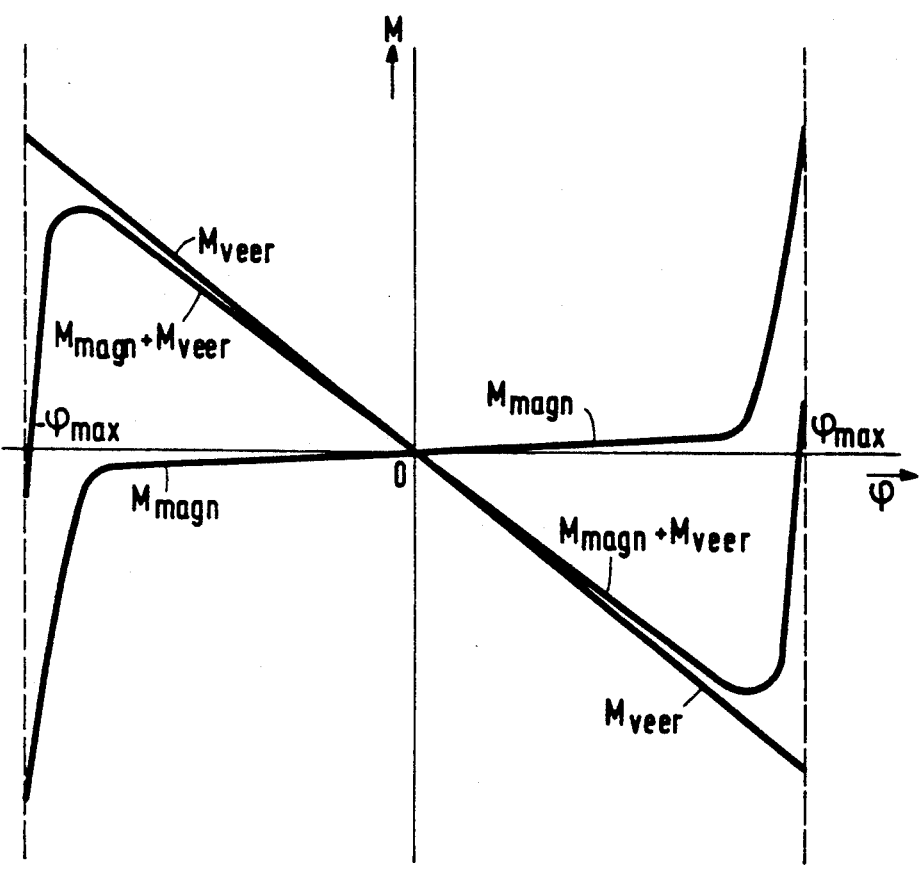

The invention is explained in more detail below with reference to the drawing, in which FIG. 1 shows a front view of a device according to the invention, FIG. 2 shows the device of FIG. 1 partly in side elevation and partly in cross-section taken on the line II—II in FIG. 1, FIG. 3 is a cross-section of the device taken on the line III—III in FIG. 2, and FIG. 4 shows a graph representing the relation between, on the one hand, the mechanical and magnetic moment exerted on a shutter of the device of FIG. 1 and, on the other hand, the position of the shutter relative to a housing of the device.

DESCRIPTION OF THE INVENTION

The device illustrated in FIGS. 1 to 3 is provided with a metal housing 1 and a metal plate-shaped shutter 5 which is rotatable relative to the housing 1 about an axis of rotation 3 and which is situated in a plane transverse to the axis of rotation 3. The shutter 5 is, as is shown in FIG. 2, fastened to a round mounting plate 9 of a metal spindle 11 by means of screw connections 7, the metal spindle 11 having a centerline 13 which substantially coincides with the axis of rotation 3 and which is rotatably supported in bearing bushes 19 and 21 of the housing 1 with journals 15 and 17, respectively. The bearing bushes 19 and 21 are made of a synthetic material and are provided in a first bearing support 23, which is fastened to the housing 1 by means of screw connection 25, and in a second, circular cylindrical bearing support 27, which is fastened to the housing 1 by means of screw connections 29 and which has a centerline 31 which coincides substantially with the axis of rotation 3, respectively.

As is shown in FIG. 2, the device further comprises a metal torsion spring 33 which is formed by a circular cylindrical bush 35 having a centerline 37 and a regular helical incision 39. Such an incision is provided during the manufacture of the torsion spring 33 by means of, for example, spark erosion. The torsion spring 33 thus comprises a number of turns 41 of a rectangular cross-section which are mutually separated by the incision 39. As is shown in FIG. 2, the torsion spring 33 is so fastened to the mounting plate 9 of the spindle 11 near a first end 43 by means of the screw connections 7 that the centerline 37 of the torsion spring 33 concides substantially with the centerline 13 of the spindle 11. A second end 45 of the torsion spring 33 is enclosed in a circular cylindrical recess 47 of the housing 1, which surrounds the end 45 of the torsion spring 33 without clearance, and the second end 45 is locked in the recess 47 by means of a number of screws 51 which are provided in a wall 49 of the recess 47 and which bear on the end 45 of the torsion spring 33.

As FIGS. 1 to 3 further show, a permanent magnet 57 made of a permanent magnetic material such as, for example, samarium-cobalt is provided on a spindle portion 53 of the spindle 11 situated near the bearing bush 19 and provided with screwthread near an end 55, which permanent magnet is provided with a bore-hole 59 and extends relative to the spindle portion 53 in an x-direction which is indicated in FIG. 3, wherein the permanent magnetic 57 is perpendicular to the axis of rotation 3, and is coupled to the spindle portion 53. Pole shoes 61 and 63 made of a soft magnetic material such as, for example, cobalt-iron are fastened to the permanent magnet 57, which is magnetized in the x-direction, the pole shoes oppose one another diametrically in the x-direction. As FIG. 2 further shows, the permanent magnet 57 and the pole shoes 61, 63 are fastened to the spindle portion 53 by means of bolts 65 and 67 which are provided in bore-holes 69 and 71 provided in the pole shoe 61, bore-holes 73 and 75 provided in the permanent magnet 57, bore-holes 77 and 79 provided in the spindle portion 53, and bore-holes 81 and 83 provided in the pole shoe 63, respectively, each of the bore-holes 81 and 83 being provided with screwthread, while the bore-holes 69, 73, 77, 81 and the bore-holes 71, 75, 79, 83, are arranged coaxially, respectively, in radial direction. The permanent magnet 57 and the pole shoes 61, 63 are enclosed in an axial direction between a first closing plate 85, which forms part of the spindle 11, and a second closing plate 87, which is secured around the spindle portion 53 by means of a nut 89 provided around the end 55 of the spindle portion 53.

As is shown in FIG. 3, the pole shoes 61 and 63 are provided with side surfaces 91, 93 and side surfaces 95, 97, respectively, each of the pairs of side surfaces (91, 97) and (93, 95) being situated in a plane through the axis of rotation 3, while the pairs (91, 97) and (93, 95) are mutually symmetrically mirrored relative to a plane which goes through the axis of rotation 3 and the x-axis.

As is shown in FIGS. 2 and 3, the housing 1 of the device is provided with a magnetic yoke 99 made of a soft magnetic material such as, for example, cobalt-iron and having a substantially circular cylindrical outer wall 101. The yoke 99 extends parallel to the axis of rotation 3, the outer wall 101 concentrically surrounding the spindle portion 53 of the spindle 11. The yoke 99 further comprises a first inner wall 103 and a second inner wall 105, each of which forms a boundary of an imaginary circular cylinder 106 which concentrically surrounds the spindle portion 53, the inner walls 103 and 105 being symmetrically mirrored relative to a plane of symmetry 107 which goes through the axis of rotation 3 and is indicated in FIGS. 1 and 3.

The yoke 99 is further provided with flat stops (109, 111) and (113, 115) for the pole shoes 61 and 63, respectively, each of the pairs (109, 115) and (111, 113) being situated in a plane through the axis of rotation 3, and the pairs (109, 115) and (111, 113) are mutually symmetrically mirrored relative to the plane of symmetry 107.

As is shown in FIG. 3, the yoke 99 comprises between the stops 109 and 111 and between the stops 113 and 115 a first attachment wall 117 and a second attachment wall 119, respectively, for an electric coil 121, the attachment walls 117 and 119 each forming a boundary of an imaginary circular cylinder 123 which surrounds the spindle portion 53 substantially concentrically. Recesses 125 extending parallel to the axis of rotation 3 are provided in each of the attachment walls 117, 119. Copper wire 127 provided with an electric insulation sheath is wound in the recesses 125 of the attachment walls 117 and 119, FIG. 1 indicating how portions 129 of the copper wire windings provided in the attachment wall 117 are connected near a front 131 of the yoke 99 to portions 133 of the copper wire windings provided in the attachment wall 119. The portions 129 and 133 of the copper wire windings are interconnected in a corresponding manner near a rear side 135 of the yoke 99 indicated in FIG. 2.

The end 45 of the torsion spring 33 is so locked in the recess 47 by means of the screws 51 that the torsion spring 33 exerts no mechanical moment on the spindle 11 and on the shutter 5 mounted on the spindle 11 in a rest position of the shutter 5 in which the x-axis is in the plane of symmetry 107. When the shutter 5 is rotated from the rest position about the axis of rotation 3, the torsion spring 33 is elastically deformed and exerts a mechanical moment $M_{spring}$ on the spindle 11 about the axis of rotation 3. In the torsion spring 33 described above, the value of the moment $M_{spring}$ is substantially proportional to the size of an angle $\phi$ enclosed by the x-axis and the plane of symmetry 107 (see FIGS. 1 and 3), so that the quantity of mechanical energy stored through elastic deformation in the torsion spring 33 is substantially the same in a first position of the shutter 5, in which the side surfaces 93 and 95 of the pole shoes 61 and 63 rest against the stops 111 and 113 of the yoke 99, respectively, and in which $\phi = \phi_{max}$, and in a second position of the shutter 5, in which the side surfaces 91 and 97 of the pole shoes 61 and 63 rest against the stops 109 and 115 of the yoke 99, respectively, and in which $\phi = \phi_{min} = -\phi_{max}$. The relation between $M_{spring}$ and $\phi$ is shown in the graph of FIG. 4.

Besides the moment $M_{spring}$ of the torsion spring 33, a moment $M_{magn}$ is exerted on the spindle 11 about the axis of rotation 3 by the magnetic field of the permanent magnet 57, which has a direction opposite to that of the moment $M_{spring}$ and which has a value which is chiefly determined by the portions of the magnetic field directed towards the stops 109, 111 and 113, 115 of the yoke 99 from the side surfaces 91, 93 and 95, 97 of the pole shoes 61 and 63, respectively. The moment $M_{magn}$ is negligibly small for comparatively small values of the angle $\phi$ because in that case the distance between the pole shoes 61, 63 and the stops 109, 111, 113, 115 is great. The moment $M_{magn}$ has a maximum value when the shutter 5 is in the first position or in the second position, with the pole shoes 61, 63 resting against the stops 111, 113 or the stops 109, 115, respectively. When the shutter 5 is rotated from the first or the second position about the axis of rotation 3, the value of the moment $M_{magn}$ decreases strongly owing to the increasing distance between the pole shoes 61, 63 and the stops 111, 113 or the stops 109, 115, respectively. The relation between $M_{magn}$ and $\phi$ is shown in the graph of FIG. 4.

The torsion spring 33, the permanent magnet 57, the pole shoes 61, 63 and the yoke 99 are so dimensioned that the moment $M_{magn}$ is greater than the moment $M_{spring}$ in the first and in the second position of the shutter 5. It is achieved in this way that the pole shoes 61, 63 are held against the stops 111, 113 and the stops 109, 115, respectively, against the spring force of the torsion spring 33 in either of the two positions under the influence of the magnetic field of the permanent magnet 57.

The device operates as follows. To start the device from the rest position, in which the x-axis is situated in the plane of symmetry 107, the electric coil 121 is provided with an alternating current having an electrical frequency which is substantially equal to the mechanical natural frequency of the device. To this end, the device is provided with an electronic control unit 137 which is electrically connected to electrical connections 139 and 141 of the coil 121. The mechanical natural frequency of the device is determined by the torsional rigidity of the torsion spring 33 and by the moment of mass inertia of the torsion spring 33, the spindle 11, the permanent magnet 57 and the pole shoes 61, 63, as well as by the damping of the device. Owing to the interaction between the magnetic field of the permanent magnet 57 and the magnetic field generated by the alternating current in the coil 121, a moment $M_{em}$ is exerted on the spindle 11 about the axis of rotation 3 with a frequency which is equal to the electrical frequency of the alternating current and the mechanical natural frequency of the device. The spindle 11 with the shutter 5 performs a rotational vibration with an increasing amplitude under the influence of the moment $M_{em}$ until the pole shoes 61, 63 are held in the first or in the second position under the influence of the magnetic field of the permanent magnet 57. The coil 121 thus acts as an excitation or starting coil. The device possesses only a small quantity of mechanical damping, so that the shutter 5 is brought from the rest position into the first or second position within a few cycles of the alternating current.

When used in a system for the deposition of materials in the form of thin layers on a substrate, the shutter 5 shuts off a window 143 which is diagrammatically depicted in FIG. 1 in the first position during operation, so that a material flow, which comes from a continuously operating source of material and which is aimed at the substrate, is interrupted. To displace the shutter 5 from the first position to the second position and expose the substrate to the material flow, the control unit 137 passes a direct current through the coil 121 for a short period. The strength and direction of the direct current are such that the magnetic field of the permanent magnet 57 at the area of the pole shoes 61, 63 is attenuated by the electromagnetic field generated by the direct current in the coil 121, so that the moment $M_{spring}$ of the torsion spring 33 is greater than the sum of the moment $M_{magn}$ exerted by the magnetic field and the moment $M_{em}$ exerted by the electromagnetic field. As a result, the shutter 5 is displaced from the first to the second position under the influence of the moment $M_{spring}$, the pole shoes 61, 63 being held against the stops 109, 115 by the permanent magnet 57 upon reaching the second position. Thus the coil 121 acts as a field attenuation coil for the magnetic field of the permanent magnet 57. As was stated above, the device posseses a small mechanical and electromagnetic damping, caused by friction between the journals 15, 17 and the bearing bushes 19, 21 and by eddy currents in the yoke 99, respectively. Depending on the extent of the damping, a stronger direct current may be passed through the coil 121 than is strictly speaking necessary for attenuating the magnetic field of the permanent magnet 57. A quantity of kinetic energy is thus transferred by the electromagnetic field of the coil 121 to the shutter 5 which is necessary for overcoming the damping present during the displacement of the shutter 5.

A displacement of the shutter 5 from the second to the first position takes place in a corresponding manner. The torsion spring 33 forms an energy buffer during this, which buffer supplies the quantity of kinetic energy necessary for a displacement of the shutter 5 stored in the torsion spring 33 through elastic deformation during the preceding displacement of the shutter 5. The device thus requires only a small supply of energy, since a current through the coil 121 is necessary during a comparatively short period only for the displacement of the shutter 5. No energy supply is required for holding the shutter 5 in either of the two positions.

The time required by the shutter 5 for a displacement from the first to the second position or a displacement from the second to the first position, the so-called opening or closing time, respectively, is determined by the mechanical natural frequency $f_{res}$ of the device and is substantially equal to $1/(2.f_{res})$. The desired opening and closing times are obtained through optimization of the moment of mass inertia of the rotating parts of the device and the torsional rigidity of the torsion spring 33. The device is notable in that a very short opening and closing time can be obtained with it. Such opening and closing times are desirable in the position of layers having a thickness of only a few atom diameters, for which short deposition times are used. It is necessary for the opening and closing times of the shutter 5 to be short in relation to the deposition timed used in order to obtain an even thickness of the layers.

It should be noted that the device according to the invention has a compact construction and a log, maintainance-free life, so that the device, also in view of its small energy supply, is eminently suitable for application in a vacuum chamber, such as, for example, the deposition chamber of a system for the deposition of superconducting materials, which chamber is under vacuum. Furthermore, the device may be used, for example, in systems for semiconductor epitaxy, systems for deposition and epitaxy of metallic multilayers and system for deposition and epitaxy of oxidic materials which have a layer structure with specific crystallographic orientations.

It should further be noted that, instead of a rotary shutter, a translatory shutter may also be used, for which, for example, conventional tension springs or leaf springs may be used. The use of a rotary shutter, however, provides the shutter with a simple support.

It is furthermore noted that the term torsion spring denotes a spring which exerts a torque on a spindle when this spindle is rotated about the centerline of the spindle. In the case of the torsion spring 33 used here on which the shutter 5 is mounted near an end of the torsion spring, the shutter 5 may also be fastened to the torsion spring near a central surface of the torsion spring which is transverse to the centerline 37. Instead of the torsion spring used here, a different type of torsion spring may also be used, such as, for example, a torsion spring having helical turns which are situated in one plane. An assembly of conventional tension and compression springs may also be used instead of the torsion spring 33. It is difficult, however, to set the rest position with alternative spring types and other spring types, such as, for example, gas springs.

It should further be noted that, instead of the electromagnetic means for starting the shutter 5 and holding the shutter 5 in the two positions, other means may alternatively be used. For example, separate permanent magnets with field attenuation coils may be used for holding the shutter 8 in each of the two positions, and a separate permanent magnet having an excitation coil may be used for starting the shutter 5. This, however, leads to a more complicated construction of the device. In addition, mechanical or electromechanical retention means may be used instead of a permanent magnet with a field attenuation coil. These alternative retention means, however, are less reliable in general, have a shorter life, or require a greater supply of energy. The application range is more restricted then. Furthermore, the means for holding the shutter 5 in the two positions may be omitted if the device is provided with a drive unit for the shutter 5, with which the shutter 5 can also be retained in the two positions. The torsion spring then acts as an energy buffer with which a reduction of the required energy supply of the drive unit is achieved.

Finally, it is noted that the permanent magnet 57 is protected against mechanical peak loads by the pole shoes 61, 63, which loads occur when the pole shoes 61, 63 hit against the stops 109, 115 or 111, 113. A yoke without stops may alternatively be used instead of the magnetic yoke 99. In general, however, a yoke without stops leads to a less accurate operation of the device. This is because the use of the stops leads to a favourable characteristic of the moment $M_{magn}$ as a function of the angle $\phi$, the moment $M_{magn}$ being effective only if the pole shoes 61, 63 are close to the stops 109, 115 or 111, 113 (see FIG. 4). As a result, the direct current needs to be supplied during a very short time only (low power dissipation) and the total moment $M_{spring} + M_{magn}$ has a linear relation to the angle $\phi$ over a wide range (opening and closing times can be accurately defined). Moreover, the use of the stops achieves that the material deposited on the shutter 5 during operation and causing an undesirable increase in the moment of mass inertia is flung off the shutter 5 the moment the shutter 5 reaches either of the two positions.

We claim:

1. A device for interrupting material flow comprising:
   (a) a housing,
   (b) a shutter being displaced between a first position and a second position,
   (c) mechanical spring means for moving said shutter between said first and second position, said mechanical spring means including at least one spring being elastically deformed by displacement of said shutter relative to said housing, wherein substantially equal amounts of mechanical energy are stored in said spring means during elastic deformation to said first position and to said second position,
   (d) permanent magnet means for holding said shutter relative to said housing in each of said first position and in said second position against a spring force of said spring means, said permanent magnet means being fastened to a rotating spindle, and
   (e) an electric field attenuation coil fastened to said housing, said permanent magnet means resting against stops of a magnetic yoke of said electric field attenuation coil in either said first position or in said second position.

2. A device according to claim 1, wherein said permanent magnet means includes pole shoes, said pole shoes resting against said stops.

3. A device according to claim 1, wherein said shutter is rotatably supported in said housing, and wherein said spring means is a torsion spring being fastened to said housing near a first end and being fastened to said rotating spindle near a second end.

4. A device according to claim 3, wherein said torsion spring is provided by a circular cylindrical bush having a helical incision.

5. A device according to claim 1, wherein an electric excitation coil is disposed to displace said shutter from a rest position to either said first position or to said second position, and wherein no mechanical energy is stored in said spring means at said rest position.

6. A device according to claim 5, wherein said electric field attenuation coil and said electric excitation coil are integrated.

* * * * *